United States Patent [19]

Wolff

[11] Patent Number: 5,027,571
[45] Date of Patent: Jul. 2, 1991

[54] FRAME FOR LEADING LINES THROUGH A STRUCTURAL PART

[75] Inventor: Anton Wolff, Brakel-Gehrden, Fed. Rep. of Germany

[73] Assignee: Roxtec AB, Ronneby, Sweden

[21] Appl. No.: 593,088

[22] Filed: Oct. 5, 1990

[30] Foreign Application Priority Data

Jan. 29, 1990 [DE] Fed. Rep. of Germany ....... 9000975

[51] Int. Cl.⁵ .............................................. H02G 3/22
[52] U.S. Cl. ...................................... 52/221; 52/220; 52/577; 174/49
[58] Field of Search ................. 52/732, 221, 577, 220; 174/48, 49; 220/3, 9, 645

[56] References Cited

U.S. PATENT DOCUMENTS 4,702,444 10/1987 Beele ..................................... 174/48

Primary Examiner—Richard E. Chilcot, Jr.
Assistant Examiner—Robert Canfield
Attorney, Agent, or Firm—Chilton, Alix & Van Kirk

[57] ABSTRACT

Disclosed herein is a plastic frame for leading lines through an opening in a structural part, such as a wall. The frame has a cavity defined by two C-shaped elements having inner flanges which are perpendicular to the plane of the frame, and outer flanges which are parallel to the plane of the frame. The leg portions of one of the C-shaped elements extend toward the leg portions of the other. A double T-shaped element can be situated between the C-shaped elements in order to form two cavities. The frame is useful for obtaining a water-tight and/or gas-tight seal when wires, tubes, etc. are led through a wall.

14 Claims, 3 Drawing Sheets

FRAME FOR LEADING LINES THROUGH A STRUCTURAL PART

The invention relates to a frame of plastic for leading a multiplicity of lines, enclosed by parallelepipedal packing pieces, through an opening in a structural part, having inner flanges, which are arranged perpendicular to the plane of the frame, and outer flanges, which are arranged substantially parallel to the plane of the frame.

With such lead-throughs, substantially round, oval, angular or other lines such as electric lines, supply lines, disposal lines, water lines, hydraulic lines, electric conductor bars etc. can be led through structural parts, for example walls. The lines are in this case enclosed by packing pieces having parallelepipedal outer dimensions. If a plurality of such packing pieces with lines enclosed therein are then arranged next to one another and one above the other, a rectangular arrangement of packing pieces with anchor plates in between is obtained, which are inserted into the frame and compressed there such that there are no longer any intermediate spaces. In this way, the lines can be led water-tightly and gas-tightly through a structural part, which may be a concrete bottom, a concrete wall, a concrete ceiling, or, in shipbuilding, a bulkhead or deck. With the corresponding lead-throughs, one also obtains a lead-through which is resistant to fire, excess pressure and to attack by rodents. In this way, the spreading of water, fire, gases, rodents and the like through structural parts can be effectively prevented at the otherwise existing weak points where the lines are laid. This is important in particular where buildings are of a special type and use, many people are to be found and/or where valuable property is to be protected. These multifunctional lead-throughs also have the advantage that they can be taken apart again if lines have to be exchanged, which with computer lines, for example, is relatively often the case.

At the same time, it is known to produce the frame in one piece from steel. The disadvantage is that such a system is quite inflexible, as it is necessary when a plurality of such frame openings are to be arranged next to one another or one on top of the other for many types of correspondingly larger multiple frame arrangements to be produced and kept in stock. In addition, these frames are normally of steel, so they have the disadvantage of high thermal conduction and considerable weight and, aside from that, are expensive.

Plastic frames of the type mentioned at the beginning (European Laid-open Application 0,271,460) partly avoid these disadvantages but have the disadvantage that they are of a very complicated structure and consist of very many different individual parts and cause high production costs.

The object of the invention is to provide a simple frame which consists of few different individual parts and is easy to assemble.

The solution achieving this object according to the invention is for the frame to have two identical, substantially C-shaped elements with two legs, which are arranged perpendicular to a central portion.

The frame is thus very simply structured, consisting just of two identical C-shaped elements which can be assembled into a rectangular frame. This frame is then encased in concrete or masonry. Once the cement or concrete has set, the lines with the packing pieces surrounding them can be inserted into the frame and a pressure-exerting means can be used in a known way to compress packing pieces and cables gas-tightly. The counter-pressure thereby generated need not be absorbed by the frame, but is transferred via the frame to the structural part. It is therefore of no consequence that the frame only consists of plastic. On the other hand, as already mentioned, the advantage of plastic is lower thermal conduction and lower costs. Also, such a plastic frame cannot rust.

If the frame has at least one substantially double T-shaped element, the cross-piece of which extends perpendicularly to the plane of the double T and the legs of which have inner flanges extending perpendicularly and outer flanges extending substantially parallel to the plane of the double T and are at the same distance from each other as the legs of the C-shaped element, one or more of these double T elements can be arranged between two C-shaped frame elements directed with their openings toward each other, so that two, three or even more rectangular openings are obtained next to one another, through which the cables can be led. In this way, with just two different components one obtains a very versatile system and the possibility of providing as many frame openings as desired next to one another.

The C-shaped and double T-shaped elements also have the advantage that they can be stacked partially one in the other, which brings about considerable advantages in transportation and storage. The rectangular closed frames require considerably more space.

If the legs of the C-shaped and/or double T-shaped element are provided with interacting projections and recesses, they can be correctly positioned relative to each other more easily during encasing in masonry or concrete. The projections and recesses may be tongues and grooves, the latter being in particular of dovetail form.

The frame becomes stronger if it has reinforcing ribs which are arranged perpendicular to at least one of the flanges. In this case, the recesses/projections with which the elements are mutually aligned are expediently arranged on reinforcing ribs. Through-holes may also be arranged in the region of the reinforcing ribs, so that the frame elements can be fixed to one another with screws or bolts. However, this is not necessary.

If the flanges arranged parallel to the plane of the frame are connected to the flanges arranged perpendicular thereto in the center of the said perpendicular flanges, these flanges are situated in the wall and are not exposed to high temperatures in the event of a fire. In addition, in this way the elements are symmetrical. The middle flange is in this case always in the same place irrespective of which way round the frame element is fitted.

The frame elements preferably consist of filled thermoset plastic, glass fiber reinforced polyester or flame retardant thermoplastic.

As a rule, it is necessary to provide shims (anchor plates) of sheet metal between layers of packing pieces, both the opposite longitudinal edges of said shims being provided with a thickening. By these shims, the forces during compression of the packing pieces are distributed uniformly and the arrangement of packing pieces is prevented from bending out towards one side of the wall, in particular whenever the lines are pushed or pulled. If the thickenings consist of plastic, there is the advantage here that the thermal conduction is less. In the event of a fire on one side of the lead-through, less heat is therefore conducted, with the result that the heat flow is retarded and the temperature increase is significantly reduced. In addition, metal corrosion is prevented.

The invention is described below using advantageous embodiments with reference to the accompanying drawings, in which.

Figure 2:
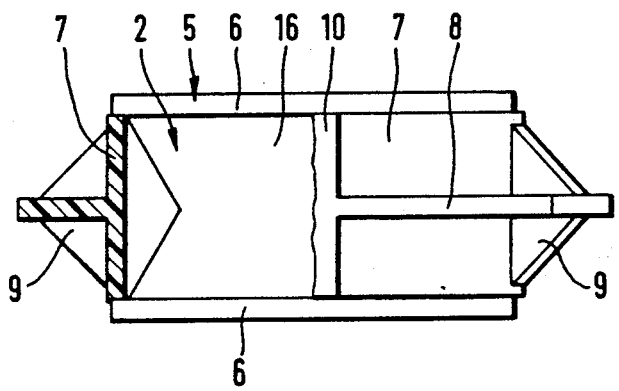
FIG. 2 shows a view with partial cross-section along the line II—II of FIG. 1.
Figure 1:
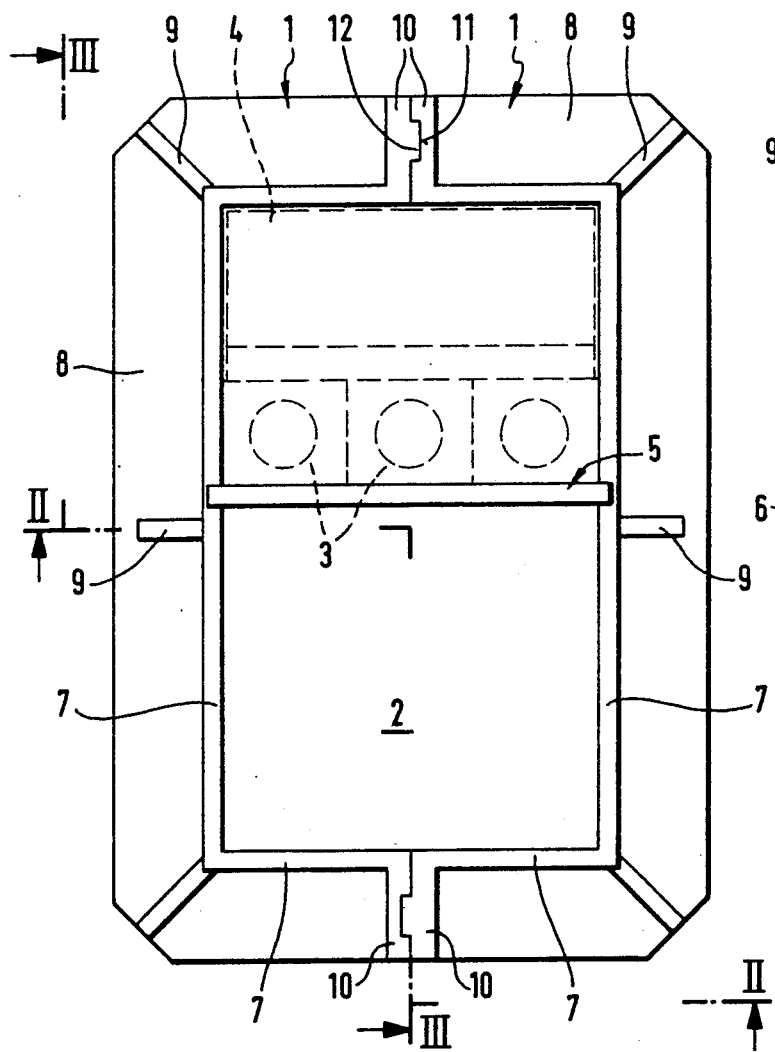
FIG. 1 shows a frame construction of the invention in plan view.
Figure 3:
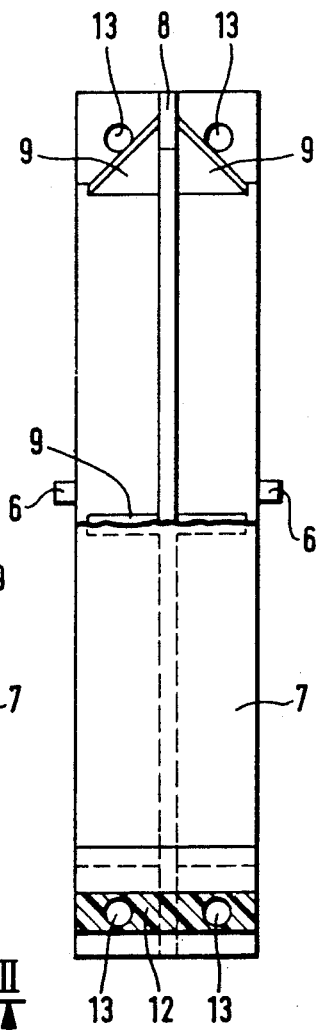
FIG. 3 shows a view with partial cross-section along the line III—III of FIG. 1.

The frame 1 shown in FIG. 1 consists of two substantially C-shaped frame parts, which enclose a rectangular opening 2. A plurality of packing pieces 3, indicated by dashes, are to be inserted with lines into this opening, said packing pieces with lines being compressed by a means 4, which is likewise indicated by dashes. In this arrangement, between layers of packing pieces 3 there are also shims 5 provided, which are described further below in conjunction with FIG. 8. Of these shims 5, only the marginal, thickenings 6, but not the central metal plate 16 can be seen in each case in FIGS. 1 and 3.

The space 2 inside the two C-shaped elements 1 is enclosed by flanges 7, which are arranged perpendicular to the plane of the frame and are adapted to support the packing pieces 3. Arranged on the outside perpendicular to these flanges 7 in the center of the flanges 7 there is on the latter a flange 8. The flange 8 is attached t the structure of a building or the like, as by encasement in concrete or masonry, and in turn provides support for the inner flanges 7. Provided perpendicular to at least one of the flanges are reinforcing ribs 9, 10, which are connected to the two flanges 7, 8. These reinforcements may also take the form of thickenings or beads. The two elements 1 are assembled at the flanges 10. On the facing surfaces of the flanges 10 there are recesses 11 and projections 12, respectively, provided in the form of a groove and tongue, which facilitate the assembling of the C-shaped elements. In the region of the recesses 11/projections 12 there are also holes 13 provided, through which screws with which the elements can be screwed together can be fitted.

Figure 4:
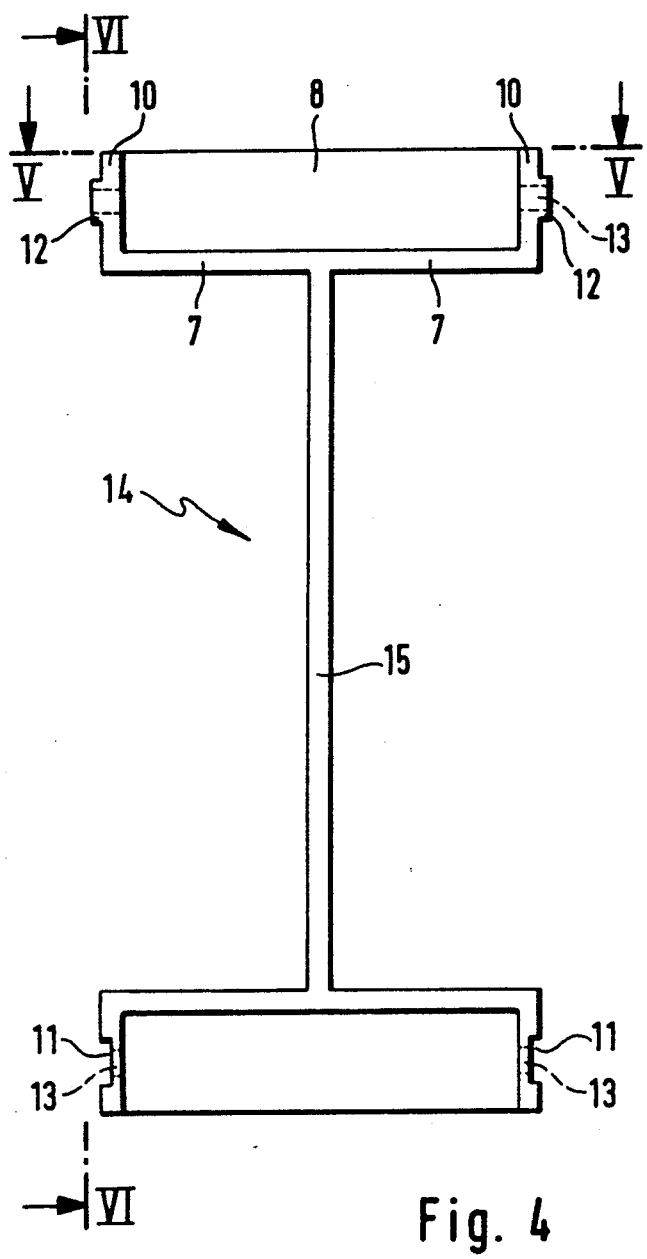
FIG. 4 shows a further frame element in a similar view as in FIG. 1.
Figure 6:
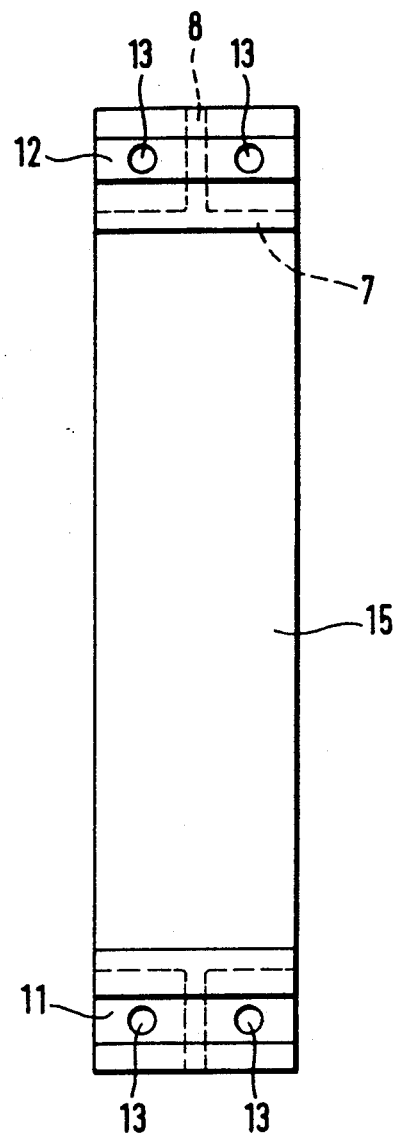
FIG. 6 shows a view along the line VI—VI of FIG. 4.
Figure 5:
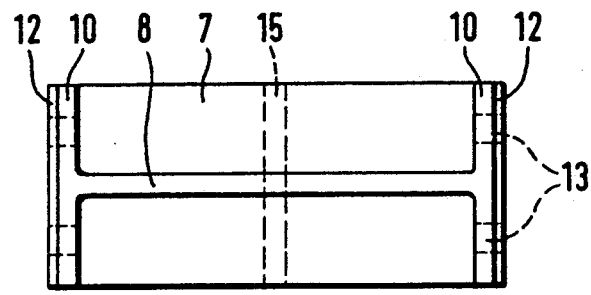
FIG. 5 shows a view in the direction of the line V—V of FIG. 4.

In addition, double T-shaped elements 14, which are shown in FIG. 4, may be arranged between the two C-shaped elements 1. These double T-shaped elements have a cross-piece 15 connecting the two legs of the T, said cross-piece increasing the cavity 2 of FIG. 1 into two cavities or channels 2 of equal size. In this case, the wall 15 has the same orientation as the flanges 7. On the legs of the double T there are again corresponding flanges 7 provided, which bound the spaces 2. In the center of these flanges 7 there are flanges 8. At the ends of these flanges 8 are arranged the reinforcing ribs 10 with projections 12 and recesses 11, in the region of which holes 13 are again provided.

Figure 7:
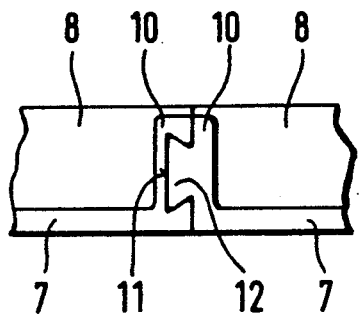
FIG. 7 shows an alternative embodiment of the connection of two frame elements.

In FIG. 7, a somewhat different form is shown, namely a dovetail-like form of grooves 11 and tongues 12. In the case of this type of connection, the frame parts hold together during assembly even without a screw connection.

A plurality of openings 2 next to one another is obtained by separating the two C-shaped elements 1 from each other and arranging one or a plurality of double T elements 14 next to one another in between. Thus, with only two different types of frame elements, either the arrangement represented in FIG. 1, with one opening 2, or else an arrangement with very many openings 2 arranged next to one another can be obtained.

Figure 8:
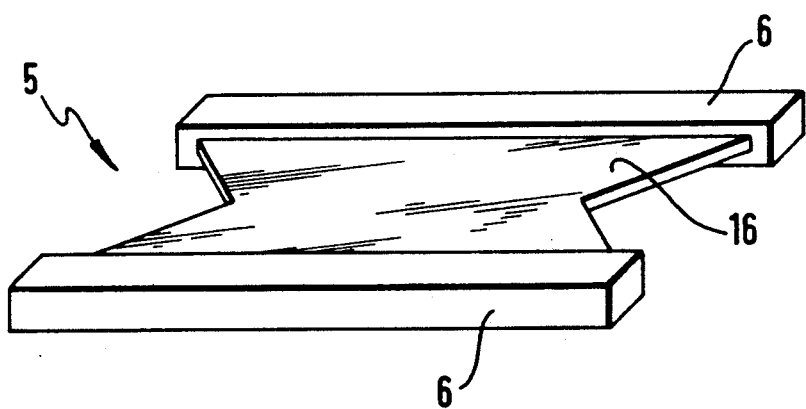
FIG. 8 shows a shim in perspective representation.

In FIG. 8, the shim already mentioned is shown, the central metal plate 16 of which is enclosed by marginal thickenings 6 of plastic. This shim is arranged between two layers of packing pieces 3, the marginal thickenings 6 being supported on the flanges 7, in order that the packing pieces 3 with the lines therein cannot push out to the front or rear.

I claim:

1. A substantially planar frame of plastic defining a cavity for leading a multiplicity of lines through an opening in a structural part, said frame having first inner flanges arranged substantially parallel to the plane of the frame, for attachment to the structural part and for supporting the inner flanges;

wherein the frame includes two identical, substantially C-shaped elements (1) each having a central portion and two leg portions projecting transversely in the same direction from the central portion, the leg portions of one C-shaped element projecting toward the respective leg portions of the other element.

2. A frame as claimed in claim 1, further comprising at least one substantially double T-shaped element (14), having a cross-piece (15) extending perpendicularly to the plane of the frame, and having legs comprising second inner flanges (7), extending perpendicularly, and second outer flanges (8), extending substantially parallel to the plane of the double T-shaped element, wherein said cross-piece separates said cavity defined by the frame into at least two channels.

3. A frame as claimed in claim 1, wherein the legs of the C-shaped element (1) are provided with interacting projections (12) and recesses (11).

4. A frame as claimed in claim 3, wherein the projections (12) and recesses (11) are tongues and grooves.

5. A frame as claimed in claim 4, wherein the tongues (12) and grooves (11) are of dovetail form.

6. A frame as claimed in claim 1, including reinforcing ribs (9,10), which are arranged perpendicular to at least one of the outer flanges (8).

7. A frame as claimed in claim 6, wherein the recesses and projections (11, 12) are arranged on the reinforcing ribs (10).

8. A frame as claimed in claim 6, wherein through-holes (13) are arranged in the region of the reinforcing ribs (10).

9. A frame as claimed in claim 1, wherein the first outer flanges arranged parallel to the plane of the frame are connected to the center of the first inner flanges.

10. A frame as claimed in claim 2, wherein the C-shaped elements (1) and double T-shaped elements (14) consist o filled thermoset plastic.

11. A frame as claimed in claim 2, wherein the C-shaped elements (1) and double T-shaped elements (14) consist of glass fiber reinforced polyester.

12. A frame as claimed in claim 2, wherein the C-shaped elements (1) and double T-shaped elements (14) consist of thermoplastic.

13. A frame as claimed in claim 1, further including at least one shim, (5) in the form of a metal plate, the two opposite longitudinal edges of which are provided with a plastic thickening (6) said shim being disposed between said C-shaped elements and perpendicular to said plane of said frame.

14. A frame as claimed in claim 2, wherein the legs of the C-shaped element (1) and the double T-shaped element (14) are provided with interacting projections (12) and recesses (11).

* * * * *